Patented July 1, 1941

2,247,411

UNITED STATES PATENT OFFICE 2,247,411

CRESOL-HYDROCARBON-FORMALDEHYDE CONDENSATION PRODUCT

Fritz Rostler, Vilma Mehner, Vienna, Germany, and Leopold Bornstein, Krakow, Poland No Drawing. Application August 31, 1938, Serial No. 227,862

7 Claims. (Cl. 260—19)

This invention or discovery relates to plastic compositions; and it comprises plastic compositions in liquid and solid form, containing as an essential ingredient certain unsaturated hydrocarbon compounds of high viscosity and high molecular complexity as indicated by low iodine number, said hydrocarbon compounds being obtainable from waste products of the oil refining industry, including petroleum acid sludge and the residue of extraction with various known selective solvents, and being compatible with substantially all ingredients employed in paints, varnishes, lacquers, plastics, and synthetic resins, including oils, both drying and non-drying, and the constituents of synthetic resins; and it comprises methods of producing these plastic compositions; all as more fully hereinafter set forth and as claimed.

A considerable number of inorganic and organic materials have been employed or proposed for working up into condensation products which may be hardened. The resulting products include resinous bodies and lacquers which are hardenable, usually by the application of heat in one or two stages. Among all these materials, however, the petroleum hydrocarbons have found little or no application, except as lubricants. This is apparently because of the fact that the petroleum products heretofore available, being generally of a chemically inert or indifferent character, are unsuitable for condensation reactions. They also have little compatibility with finished artificial resins. Cracked products of the petroleum industry, and other unsaturated hydrocarbons thereof, have been used to replace drying oils in air-drying lacquers, or to partially replace them, but these attempts to employ petroleum hydrocarbons in the plastic arts have not, as a rule, been very successful.

We have now found that a raw material may be obtained from the waste products of refining processes employed in the petroleum industry, which, because of its particular characteristics, is adapted for taking part in condensation reactions. This material is also a good organic filler, or, in other words, a resin carrier or artificial resin constituent, adapted for employment in the production of condensation products which can be heat-hardened. This material has a high molecular weight, usually from 400 to 1000; it is weakly unsaturated, as indicated by a low iodine number which may be on the order of 20; it is essentially a hydrocarbon, as indicated by numerous analyses showing compositions approximating 90 per cent carbon and 10 per cent hydrogen, which correspond to the general formula $(C_3H_4)_n$; and it is much more viscous than the oils in the refining of which it is produced. In appearance, it is generally a reddish brown, greenly fluorescent oil, or more or less fluid resin; and it is capable of polymerization and condensation.

This unsaturated hydrocarbon material is also characterized by solubility in nearly all organic solvents, and in concentrated sulfuric acid. It is generally not reactive with dilute reagents, but reactive with concentrated reagents. It is capable of a far-going reaction with sulfur, which is similar to caoutchouc vulcanization.

As starting materials for the recovery of these hydrocarbon materials, there may be used the acid sludges which are formed in the refining of mineral oil products with sulfuric acid, and the residues obtained in the refining of mineral oil products with various selective solvents, including furfural, phenol, cresol, dichlor-diethyl ether, liquid $SO_2$, and mixtures of liquid $SO_2$ with various organic solvents including benzol. In our prior and copending applications, Serial Nos. 751,891, filed Nov. 7, 1934, 138,666, filed April 23, 1937, 149,183, filed June 19, 1937 (now Patent No. 2,185,951), 220,584, filed July 21, 1938 (now Patent No. 2,185,952), and 224,626, filed Aug. 12, 1938, of which this application is in part a continuation, we have described and claimed various methods of obtaining the desired hydrocarbon materials from acid sludges and from the residues of solvent refining.

An object achieved by the present invention is the incorporation of these predominantly unsaturated hydrocarbon compounds and mixtures thereof obtained from the waste products of oil refining (acid sludges and solvent extract residues) in plastic compositions including lacquers, varnishes, synthetic resins, and molding powders or other molding materials, the resulting compositions being heat-hardening or oven-drying, even when containing a relatively large proportion of these new materials.

When preparing heat-hardenable condensation products including the above-described hydrocarbons, these hydrocarbons are advantageously introduced into the customary apparatus simultaneously with the other components. However, these hydrocarbons may also be added after condensation of the other constituents has started, or during, or for the purpose of, interrupting or "braking" the exothermic condensation reaction of the other constituents. Also, these somewhat unsaturated hydrocarbons of high molecular weight can be incorporated with the other constituents during the mixing and homogenizing of the molding powders with fillers, etc., as in working up molding blanks; and in this case the working up of the condensate into molding powder can be effected with or without the addition of these hydrocarbons. The amount of these hydrocarbons employed may vary widely, as shown hereinbelow.

Since the hydrocarbon materials to be added in accordance with the invention may be selected from several distillation fractions differing from each other principally in viscosity, fractions may always be chosen which are suited to the individual purposes of the desired end products. The compatibility of these individual fractions is determined by cooking them with a sample of the resins to be used, or preferably their components. The boiling limits of the fractions are advantageously so selected that they lie above the hardening temperature of the condensates employed; and it is therefore recommended, as a safety measure, that the boiling limits be determined in vacuum in order to insure provision of materials with sufficiently high boiling ranges. As a rule the high boiling and highly viscous fractions are employed.

The stated hydrocarbon materials serve in condensates as organic filling materials, and their use results in a number of very remarkable advantages. These materials thus serve as plasticizers upon addition to a condensation reaction, but differ from the ordinary plasticizers (for example, tricresyl phosphate) in that they do not separate out of the mass upon hardening, but condense with the constituents of the condensation product to a uniform integral mass. By including these hydrocarbons in the reaction mixtures, the fluidity of the resulting condensates is improved without materially increasing their hardening time. This offers the great advantage that instead of using a so-called "soft" mass, obtained in known manner by a rather short mixing in the heat to produce mixtures which can be only slightly prehardened, mixtures can be used which are fluid but can nevertheless undergo extensive prehardening.

Thus, in addition to the fact that the hydrocarbons used in accordance with the invention serve as liquifying and lubricating materials, the product remains elastic without disturbance of its prehardening property. Because of this result of these hydrocarbon additions, there is made possible an extensive homogenization of resins with filling materials, as well as an extensive prehardening and a resultant shortening of the molding time.

This effect of the stated hydrocarbon materials also appears upon working up condensates produced without the addition of these materials, if such condensates (molding powders, for example) are worked with a corresponding quantity (about 10 per cent of the mixture, for example) of these hydrocarbons on the rolls. By working together the molding powder and the additional products applied according to the invention, the customary lubricating materials, such as stearic acid, montan wax, etc., can be omitted.

Furthermore, the materials added in accordance with the invention effect an improvement of the technical properties of the condensates. Thus, synthetic resins such as phenol condensates, when produced according to the present invention, show a decided improvement in the elasticity of the finished products. This is especially noticeable in the alkali condensed phenol resins, especially the cresol-formaldehyde resins. The new condensates have good resistance against fatty and other oils, acids and dilute alkalies.

Condensates containing organic fillers produced in accordance with the above-described process can be dissolved in the usual solvents for the production of lacquers (alcohol-benzol mixtures, methylcyclohexanol, acetone, etc.) and result in oven-drying synthetic resin lacquers which, on account of their good electrical properties, are adapted for electro-technical lacquers, and for the impregnation of papers or fabrics for the production of laminated materials, etc. These lacquers are also characterized by their great resistance to fatty oils, acids, water, etc.

Condensates of the hydrocarbon materials employed according to the invention with resins which either are or are not hardenable (heat-hardening) can also be worked up into artificial resin combination lacquers, and these condensates can be cooked in the usual manner with drying oils, such as tung oil. It appears that in such cases the drying oil (e. g. stand oil, linseed oil, China-wood oil, etc.) can be completely or partially replaced by the aforesaid hydrocarbon materials. It also seems that the structure of these combination lacquers is so changed by the application of larger quantities of the added hydrocarbons of this invention that the now remaining part of the drying oil serves as a softener, while the addition material takes over the role of the drying oil. It is generally recommended, however, that in these combination lacquers a part, even if only a small part, of the drying oils be used. Larger percentage additions of the mentioned hydrocarbons can be employed in wire insulating lacquers or enamels, without the addition of drying oils.

Some lacquers which cannot be produced with linseed oil, and previously could be produced exclusively by the use of China-wood oil, can be produced by the combination of the hydrocarbon materials of the present invention with linseed oil, and with material improvement in quality. In such materials, as with those previously mentioned, the linseed oil in the presence of larger quantities of these hydrocarbon materials seems to assume the role of a softener. With such lacquers, however, with or without the addition of drying oils, there are obtained by the usual treatments and unchanged methods of heating (hardening) lacquer films or enamel coatings which, as compared with the previously known lacquers, show considerably improved acid-resistance and exceptional electrical properties.

The possibility thus presented of replacing the tung oil, which was heretofore almost exclusively employed, with a stable raw product of always constant properties has an importance which cannot be over-estimated. With drying oils, and especially tung oil, the properties are always varying in accordance with plant growth, length of storage, or other factors which in most instances cannot be controlled, and because of these variations in the raw materials, serious difficulties in application occur. For instance, there is the known susceptibility of tung oil (gelation) which, at the slightest error during fabrication, or for uncontrollable reasons, may lead to poor results. All such difficulties are eliminated by application of the stated hydrocarbon materials. To these technical advantages there is added the economic advantage that, instead of an expensive product imported from overseas, there is used a cheap raw material which is obtained from domestic waste materials, and which is independent of transportation difficulties, climatic conditions, etc.

These lacquer-like solutions of the condensates produced according to the present invention have a number of possibilities of application. For instance, they can serve in the production of artificial resin hardened paper; composite, artificial resin impregnated, fabric molded into slabs or plates; and other laminated materials for bearings, gear wheels, etc. The production of these materials may be effected by saturating paper or cloth with an oven-drying or combination lacquer produced by the required dilution of condensates according to this invention, and then heating it. The laminated fabrics produced in this manner are much better than those produced without the hydrocarbons employed according to this invention; for example, the gear wheels produced from this laminated material show, among other properties, a greater vibration damping effect and lower specific gravity.

Other finished wares producible from these new materials are mounting plates or bases for the electrical and radio industries, cases, housings and the like. The finished products are resistant to organic solvents, fats and other oils, acids and weak alkalies. The hydrocarbon materials employed in accordance with the invention do not separate from the condensates or lacquers, and do not permit extraction.

The following examples represent only a small selection of the processes and products of the invention, and the invention is in no way limited to these examples but extends to the application and treatment of many other synthetic resins with which similar results are produced upon incorporation of our hydrocarbon materials. The breadth of the field of application permits only the selection of a few typical instances, which are given below:

Examples (1)

| | Parts by weight |
|---|---|
| Formaldehyde (30 per cent) | 200 |
| Cresol | 200 |
| Ammonia (25 per cent) | 10 |
| Hydrocarbon materials according to the invention, with a boiling range of 258 to 320° C. at 12 mm. mercury, obtained from lubricating oil acid sludge | 40 | were exhausted in the usual vacuum apparatus, slowly heated to 100° C., and after completion of the reaction (30 minutes) freed from excess formaldehyde and water by distilling them off under vacuum, thus obtaining a non-sticky, elastic resin. The yield was 250 parts by weight. The condensate thus produced was used after addition of the customary fillers (to 100 parts resin some 100 parts wood flour or asbestos) and homogenizing for the production of one-step molding materials; and after solution in the customary solvents (alcohol-benzol mixtures, methylcyclohexanol, acetone, etc.) was worked up into oven-drying lacquers. These lacquers produced films which, after hardening in the oven, were more elastic than a normal Bakelite film. The hardening temperature for these resins, either as molding powders or as lacquers, is from 140 to 180° C.

(2)

| | Parts by weight |
|---|---|
| Resin according to Ex. 1 | 100 |
| Methylcyclohexanol | 25 |
| Tung oil | 20 |
| Hydrocarbon material according to the invention, obtained by refining automobile oil, and having a boiling range from 200 to 320° C. at 12 mm. mercury | 200 |

This mixture was stirred and heated, and the resulting material was diluted with 150 parts benzol, and
50 parts acetone This resulted in a transparent wire-enamelling (insulating) lacquer which, after heating at 140 to 190° C. oven temperature, produced films of the best chemical, mechanical and electrical properties.

(3)

| | Parts by weight |
|---|---|
| A non-heat-hardening resin of the type of "Novolak" | 50 |
| Wood flour (or 120 parts asbestos) | 50 |
| Coloring matter | 2 |
| Magnesium oxide | 2 |
| Hexamethylenetetramine | 7.5 |
| Hydrocarbon materials in accordance with the invention, boiling between 210 and 260° C. at 12 mm. mercury, and obtained from the acid sludge of medium machine oil | 4 | were mixed, pulverized, worked on the rolls at 90° C. to the desired hardness, prehardened and broken up. There resulted a normal rapid molding powder having exceptionally good molding properties in spite of its extensive prehardening. The product thus obtained is especially well suited for molding large objects at low pressure (soft pressing); for example, radio boxes or cabinets, machine hoods, etc.

(4)

| | Parts by weight |
|---|---|
| Formaldehyde (30 per cent) | 200 |
| Cresol | 200 |
| Ammonia (25 per cent) | 10 |
| Slightly unsaturated hydrocarbons according to the invention, with a boiling range of 240 to 280° C. at 12 mm. mercury, obtained from the extract resulting from the refining of lubricating oil with a mixture of $SO_2$ and benzol | 40 | were worked up in accordance with the process of Example 1 into a similar resin, which was subsequently converted into satisfactory molding powders and lacquers.

In the foregoing examples, the hydrocarbon constituents supplied in accordance with the present invention vary from about 6 per cent to about 70 per cent of the total resinous matter, excluding solvents, fillers, etc. Lower proportions of this material, such as 2 per cent or less, and higher proportions, such as 85 per cent or more, may also be successfully employed.

As stated hereinabove, and in the acknowledged prior applications, the hydrocarbon materials employed in accordance with this invention are characterized by high molecular weights and low iodine numbers, and by high viscosity, being often somewhat fluid resins. Their composition is invariably about 90 per cent carbon and 10 per cent hydrogen. They are soluble in most of the usual organic solvents and in concentrated sulfuric acid, and they are capable of polymerization and condensation and also of vulcanization with sulfur. As also stated, the presence of these materials in plastic compositions, and especially in phenol-aldehyde (or cresol-aldehyde) resins, is advantageous, in that the fluidity of the resins is increased without lengthening their hardening time, and in that the composite resins have especially good acid resistance and electrical properties.

As described in more detail in the acknowledged prior applications, these hydrocarbon materials are obtainable from the waste products of mineral oil refining, including acid sludge and solvent extract residues, by various procedures. Some of the useful procedures are illustrated in the following examples:

(a) A mixture of 36 parts of acid tar, obtained in refining lubricating oil with sulfuric acid, and 24 parts of pulverized chalk, was subjected to distillation in vacuo. There was obtained a reddish-brown fluorescent oil in a yield of 27 per cent on the acid tar. Most of the distillate was obtained at temperatures between 270° and 290° C. under a pressure of 12 mm. mercury, and this fraction was employed in accordance with the present invention. It was completely soluble in concentrated sulfuric acid.

(b) 100 parts of a centrifuged acid tar obtained in refining automobile oil with sulfuric acid were mixed with 60 parts of magnesite. The mixture thus obtained was pulverized and distilled in vacuo. Distillate boiling between 175° and 320° C. at 40 mm. mercury pressure was recovered for use in accordance with this invention. This product was obtained in a yield of 40 per cent on the acid tar, and was completely soluble in sulfuric acid.

(c) Into 100 parts of water heated to boiling there were introduced 20 parts of burned magnesite. This was followed by 100 parts of de-oiled acid sludge from lubricating oil refining, centrifuged with de Laval separators. The sludge was added in batches. After conclusion of the conversion, the magnesium sulfate solution formed by the reaction was drawn off and the oily conversion product of the acid sludge, after heating to 155° C., was separated from sediment and distilled under a vacuum of 20 mm. mercury. The yield was approximately 60 parts of reddish-brown, strongly fluorescent, viscous resin-like product which was almost completely soluble in concentrated sulfuric acid. Dissolution in concentrated sulfuric acid was accompanied by vigorous heat development and the formation of a product similar to acid sludge. The composition of the distillation product, after purification, was shown by analysis to be 90 per cent carbon and 10 per cent hydrogen.

(d) 100 parts of acid resin obtained by refining lubricating oil with concentrated sulfuric acid was mixed with 30 parts of calcium oxide and 100 parts of water, heated to boiling, and at the conclusion of the reaction, heated for two hours at 6 atmospheres pressure in an autoclave in the presence of 0.5 part of $FeSO_4$. After removal of the aqueous layer, the organic reaction product was diluted with gasoline, and then distilled in vacuum after elimination of the solvent. The yield was 55 per cent on the acid sludge, and the product obtained was completely soluble in sulfuric acid.

(e) 100 parts of an acid resin obtained by refining petroleum and drawn from an acid tar pit where it had been stored for three years were mixed with 55 parts of pulverized slaked lime. The mixture was distilled in vacuo in a current of superheated steam. Hydrocarbons suitable for employment in accordance with this invention and soluble in concentrated sulfuric acid were obtained in a yield of 60 per cent on the acid tar.

(f) 100 parts of acid sludge obtained in refining lubricating oil with sulfuric acid were mixed with 60 parts of lime. The dry mixture was charged into an inclined tubular chamber provided with a helical conveyor, through which a counter-current of nitrogen was recirculated. The chamber was maintained at a temperature of 350° to 390° C. Gas and vapors discharged from the chamber were cooled to a temperature of 120° C., condensing the hydrocarbon product from the gas stream before returning the nitrogen to the chamber. The yield was 42 per cent, on the acid sludge, of oily hydrocarbon material soluble in sulfuric acid and suitable for use in accordance with this invention.

(g) 100 parts of extract residue from refining mineral oil with furfural were neutralized with 5 parts MgO after distilling off the solvent and the constituents boiling below 160° C. at 12 mm. mercury. The bottom layer, which was largely inorganic material, was withdrawn, and the remaining product was distilled in vacuo. A fraction boiling between 180° and 320° C. at 20 mm. mercury pressure was recovered for employment in accordance with this invention.

(h) Into a solution of 20 parts technical MgO in 150 parts of water heated to boiling, a mixture of 100 parts of acid sludge from the sulfuric acid refining of lubricating oil and 100 parts of extract residue from refining lubricating oil with a mixture of liquid $SO_2$ and benzol was added in portions. The quantity of neutralizing agent was sufficient to neutralize the total acidity of the mixture of wastes. After separation of the solution of inorganic salts which was formed, the neutral organic reaction product was subjected to fractional vacuum distillation, and the portion boiling between 180° and 340° C. at 20 mm. mercury was recovered in a yield of 70 per cent on the total mixture.

What we claim is:

1. A heat-hardening plastic composition comprising the condensation product of a mixture containing, as essential ingredients, formaldehyde, a cresol condensable therewith to form a heat-hardening resin, and unsaturated hydrocarbons capable of condensation with said cresol and formaldehyde and having a composition of approximately 90 per cent carbon and 10 per cent hydrogen, said hydrocarbons being derived from waste products of mineral oil refining and having characteristics substantially identical with those of the products of like composition obtained by neutralizing petroleum acid sludge and fractionating the organic constituents thereof under vacuum to eliminate at least the portions boiling outside of the range from 160° to 360° C. at 12 mm. Hg.

2. The composition of claim 1, wherein said unsaturated hydrocarbons are condensed with said cresol and said formaldehyde in the presence of an alkali.

3. The composition of claim 1, wherein said hydrocarbons are added after a condensation reaction between said cresol and formaldehyde.

4. The composition of claim 1, wherein the said hydrocarbons constitute from 6 to 70 per cent of the total condensation product.

5. The composition of claim 1, in the form of a solution containing said composition dissolved in a volatile solvent comprising methyl-cyclohexanol.

6. The composition of claim 1, containing a drying oil.

7. The composition of claim 1, in the form of a lacquer comprising linseed oil.

FRITZ ROSTLER.
VILMA MEHNER.
LEOPOLD BORNSTEIN.